United States Patent [19]

Wawzonek

[11] Patent Number: 4,457,978

[45] Date of Patent: Jul. 3, 1984

[54] FORMALDEHYDE DEPRESSED PARTICLE BOARD

[76] Inventor: Stanley Wawzonek, 2014 Ridgeway Dr., Iowa City, Iowa 52240

[21] Appl. No.: 494,908

[22] Filed: May 16, 1983

[51] Int. Cl.³ .............................................. B32B 21/08
[52] U.S. Cl. .................................... 524/14; 156/62.2; 264/109; 264/122; 428/326; 428/528
[58] Field of Search ............... 428/326, 452, 528, 537; 264/109, 122; 156/62.2

[56] References Cited

U.S. PATENT DOCUMENTS 4,366,264 12/1982 Wawzonek ......................... 521/122
4,397,756 8/1983 Lehmann ........................... 428/326
4,404,250 9/1983 Clarke ............................... 156/62.2

FOREIGN PATENT DOCUMENTS 2148879 3/1973 France.

Primary Examiner—George F. Lesmes
Assistant Examiner—P. R. Schwartz
Attorney, Agent, or Firm—Zarley, McKee, Thomte, Voorhees & Sease

[57] ABSTRACT

A method and particle board composition which employs urea formaldehyde resin adhesive, but which is formaldehyde suppressed by adding to the formaldehyde resin, a small but suppression effective amount of a weak acid and calcium metal silicate.

19 Claims, No Drawings

FORMALDEHYDE DEPRESSED PARTICLE BOARD

BACKGROUND OF THE INVENTION

Condensation reaction between urea and formaldehyde has been known for many years. Urea formaldehyde based insulation foams have been commercially available in the United States since at least as early as the 1950's. They were, however, at that time not widely used. In recent times, with the emphasis on energy conservation, there has been an increasingly greater use of these materials for residential insulation, and in particular, as a foamed insulation to be used in wall spaces and the like, of existing building structures.

With the increasing use of urea formaldehyde foamed insulation to increase insulating capacity, there has been concern expressed about off-gassing of formaldehyde from the insulation, after installation. It appears that temperature and humidity affect the levels of formaldehyde off-gassing. Also, there appear to be two emission phenomena occurring. The first involves a short term release of formaldehyde and the second involves a lower level, long term release.

The release of formaldehyde from the resin into the interior of a dwelling structure is undesirable. It has been linked with certain physical and biological effects. This is particularly true for low level, long term release of out-gassed formaldehyde which may expose persons inside of the insulated dwelling to potential long term risks. In fact, because of such concerns, urea formaldehyde foamed insulation was at one time banned for use in the United States.

Thus, while urea formaldehyde is unquestionably effective from the insulating standpoint and as an adhesive resin, if it is to be used in the future, there is a real and continuing need for developing such which will eliminate or minimize the out-gassing of formaldehyde, both from the standpoint of short term release and most importantly, from the standpoint of the lower level, long term gradual release.

Urea formaldehyde resins are a mixture of products from the condensation reaction between urea and formaldehyde. The first stage of the condensation is commonly carried out at 70° to 100° C. with a urea formaldehyde ratio of approximately 1.5 and a pH of from about 4 to about 8. This results in a mixture of mono and di-methylol urea. The product of this first condensation takes on a variety of forms which are dependent upon reaction conditions such as pH, temperature and the mole ratio of urea to formaldehyde. They can be prepared as syrupy, aqueous solutions, water soluble fine grain powders, or water insoluble materials which precipitate from the reaction solution. The urea formaldehyde resin mixture previously described is often used for an adhesive in making particle board.

The particle board will out-gas formaldehyde as it is being slowly released from the adhesive. As a result, there has been some considerable recent concern about using urea formaldehyde as an adhesive resin for particle board, in spite of its known effectiveness. Such adhesives have been used for the bonding of wood in the formation of laminated beams, plywood, fiber boards, wood moldings and particle boards for more than 40-50 years. In the United States, about 75% of all UF resin is used as a wood adhesive, and 85% of this is consumed by the particle board industry.

Particle board, like UF foam, has problems with formaldehyde emission. In my prior issued patent, U.S. Pat. No. 4,366,264, issued Dec. 28, 1982, it was reported that calcium metasilicate could be used for formaldehyde suppression in UF foams. It has now been discovered that this same additive can be effectively adapted for particle board.

In use as a particle board adhesive, urea formaldehyde resin has a very large surfaced volume ratio and the resin has a variable thickness and contact with surfaces which on a microscopic scale vary in chemical, physical and mechanical behavior.

Treatments of this problem are numerous. Paper overlays, plastic laminates, veneer and metal faces, chemical coatings and paints have all been used, but cost more than the treatment with additives which can be used before or during the formation of the boards or molding. Such additives bind or absorb the formaldehyde. There have been certain prior attempts at additives. For example, a mixture of mineral oil and sodium silicate is reported to diminish the evolution of formaldehyde from particle board in the following disclosure.

Z. F. Dashkovskaya, T. G. Zakharov, T. I. Kravchenko and K. I., Stankevich, USSR, No. P 480,555, Aug. 15, 1975.

In addition, in a report by M. Higuchi, et al., Mokuzai Gakkai-shi, 26, 310 (1980), glass powder with a composition of $(Na_2O)$ 0.26$(CaO)$ 0.22$(SiO_2)$ 1.0 $B_2O_3$(0.08) was used as an acid scavenger in urea formaldehyde bonded plywood and found in amounts up to 20 percent to improve the water resistance of the plywood. The shear strength of plywood decreases with time in spite of the presence of the glass powder.

The primary objective of the present invention is to modify urea formaldehyde resins so that these resins can be still used as effective particle board adhesive, but without urea formaldehyde resin detriments of significant out-gassing. The method and manner of achieving this primary objective, as well as others, will become apparent from the detailed description of the invention, which follows.

SUMMARY OF THE INVENTION

The present invention is based on the discovery that a very specific chemical compound that is calcium metasilicate, or in its mineral form, Wollastonite when added as a finely divided suspension in a urea-formaldehyde adhesive will reduce formaldehyde emission from particle boards by 30 percent provided that the wood chips are pretreated with an acid like boric acid, or a complex between boric acid and an organic hydroxyl compound containing more than one hydroxyl group per molecule such as mannitol, invert sugar, dextrose or glycerol, or any other acid which will not solidify the adhesive but which will react with calcium metasilicate.

The invention also relates to not only the method of forming the particle board, but also the particle board itself.

DETAILED DESCRIPTION OF THE INVENTION

Calcium metasilicate, $CaSiO_3$, is a white powder insoluble in water. It is abundant and the mineral (Wollastonite) can be mined, as it is found in abundance in metamorphic rock. It is the formaldehyde suppressant of this invention, and appears to be unique. Other silicates such as sodium silicate and the like, will not work. Nor will sand or silicic acid by itself function as the formaldehyde depressant of this invention. Surprisingly, only calcium metasilicate is operable in this invention. It is therefore critical to the invention.

To accomplish the objective of this invention, the calcium metasilicate is added in a divided particulate form to the urea formaldehyde resin, as heretofore described. Preferably the calcium metasilicate is uniformly mixed throughout the resin composition by agitation and thereafter the resin is used in the conventional manner for particle board making. It has been found that when this additive and technique are employed, a marked reduction in formaldehyde out-gassing occurs.

The amount of calcium metasilicate mixed with the precondensate resin can vary considerably and the effect of formaldehyde suppression still results. Generally it has been found satisfactory when from about 15 grams of calcium metasilicate per gallon of resin to about 125 grams of calcium metasilicate per gallon of resin, is employed. However, it should be understood that these ranges are practical ranges. In other words, the out-gassing effect is minimized as long as some is added, but when the upper level expressed herein is exceeded, there is no additional practical gain achieved. Most preferably the amount of calcium metasilicate is from about 30 grams per gallon of resin to about 120 grams per gallon of resin with the very most preferred range being from about 60 grams of calcium metasilicate per gallon of resin to about 120 grams per gallon of resin.

The particle size of the calcium metasilicate does not seem to have an effect upon the amount of formaldehyde suppression. Coarser and finer grades have all been effective. By coarser grades what is meant is a particle size of which about 2% is retained on a 200 mesh standard sieve screen. Finer grades show 2% retention on a 325 mesh standard sieve screen and 400 mesh standard sieve screen, respectively.

The particular supplier of calcium metasilicate does not appear to be a critical factor, as long as the silicate employed is in fact calcium metasilicate. For example, magnesium trisilicate does not work, sodium silicate does not work, silicic acid itself does not work, rice silica does not work, pectolite does not work. Suitable calcium metasilicate can be obtained from the R. J. Vanderbilt Company, Inc., sold under the mark "Vansil-W-30; -W-20 and -W-10", which is preferred, but also NYAD, Wollastonite, 325, 400 and G from Interpace Corporation, may also be employed.

This invention does not deal with the methodology of forming particle board, apart from using the modified urea formaldehyde resin adhesive of this invention. The formation of particle board is generally well known, and typically involves agitation of wood chips, while simultaneously spraying the urea formaldehyde resin on the wood chips. Thereafter the chips are spread into a form and pressed under some heat and pressure to provide the ultimate particle board. For details with regard to the general overall technique of preparing particle board, see, Meyer, Urea Formaldehyde Resins, page 164-178, which are incorporated herein by reference.

Turning now to a specific description of the formaldehyde resin adhesive used herein for preparation of the particle board, preferred resin is urea formaldehyde resin. At the outset, it should be mentioned, it is possible to use phenol formaldehyde resins and other formaldehyde resins, but urea-formaldehyde is preferred.

In a typical particle board preparation, the resin will comprise about 6% to about 10% by weight of the particles, and quite typically about 10% by weight of the particles. The amount will vary somewhat depending upon the proprietary resin of the particular manufacturer, but will generally be within these ranges.

The amount of calcium metasilicate employed per gallon of resin is within the ranges hereinbefore specified. The calcium metasilicate is a white powder and is preferably uniformly mixed throughout the resin prior to its being used as the particle board adhesive. In addition, in order for the calcium metasilicate to properly perform its formaldehyde suppression function, there must be some acid present. It is not critical which acid is present, but the acid must be a weak acid which is substantially inert to the formaldehyde resin. That is, the acid musdt be one which will not solidify the adhesive but one which will inter-react with the calcium metasilicate to allow effective release of silicic acid, which is believed to be the effective suppressant of the formaldehyde by some "binding reaction", the precise details of which are unknown. The most preferred weak acid, both from the standpoint of effectiveness and economics, is boric acid.

The amount of weak acid, particularly boric acid used, should be sufficient to convert the calcium metasilicate to silicic acid, preferably is in a ratio of 124 of boric acid to 116 of calcium metasilicate, or 1.069:1.

While not wishing to be bound by any theory, it is believed that treatment with the released silicic acid, from the calcium metasilicate reaction with the weak acid, traps the formaldehyde in the particle board and slowly converts it to other products. The silicic acid produced is unique in this respect, since silica gel G, by Stahl with a grain size of 10–40microns and rice silica with a grain size of less than 100 microns incorporated into particle board has no effect upon the emission of formaldehyde. The silicic acid, however, prepared from the treatment of calcium metasilicate in accordance with this invention, will reduce formaldehyde emission from particle board by as much as 15%-30%.

problems encountered in the utilization of solid materials as suppressants of formaldehyde in particle boards is the uniform distribution of the material throughout the product. These problems can be minimized by generating the silicic acid on the wood chips by the following procedure. The wood chips are first sprayed with a solution of boric acid in water or with a solution of a complex between boric acid and an organic hydroxyl compound containing more than one hydroxyl group per molecule such as mannitol, invert sugar, dextrose, glycerol, etc. The choice between these two modes of operation will depend upon the percent moisture in the wood chips. These chips usually are utilized with ten percent moisture in the final production of particle board. If the percent is lower the wood chips may be sprayed with water to obtain these values. Since the solubility of boric acid is 5.15 g per 100 ml of water at 21° C. utilization of such a solution would require a low percentage of moisture in the wood chips. The solubility of boric acid increases to 39.1 g per 100 ml of water at 100° C. and the use of such solutions would be feasible with wood chips with a higher moisture content.

Complexes between boric acid and an organic hydroxyl compound containing more than one hydroxyl group molecule such as mannitol, invert sugar, dextrose, glycerol, etc. are more soluble in water and do not have this complication with respect to the moisture content and can be used with chips with higher values of the latter.

The wood chips thus treated are next sprayed with the urea-formaldehyde resin adhesive containing a finely divided suspension of calcium metasilicate (Wollastonite). This material will settle out slowly so the suspension is shaken vigorously before use.

The particle boards in the examples below were prepared using 10% by weight of adhesive, and a thickness of ⅜" board using pressures of 175-200 psi at 350° F. with a five minute curing time.

Combining the adhesive calcium metasilicate and the boric acid-complexes with polyhydroxy compounds into one mixture is viable if the mixture is not allowed to stand for any period of time. The boric acid under these conditions is a strong enough acid to solidify the adhesive. The corresponding mixture of boric acid, adhesive and calcium metasilicate is much more stable. The utilization of the boric acid in particle board formation, under the latter conditions, must occur probably through complexing with hydroxyl groups of cellulose or lignin in the wood.

The two mixtures described are much more viscous than the adhesive with calcium metasilicate alone and are difficult to administer uniformly.

The particle size of the calcium metasilicate does not seem to have a pronounced effect on the amount of formaldehyde suppression.

A comparison of the following three grades of calcium metasilicate was made:

a. Coarse grade-particle size of which 2% is retained on a 200 mesh standard sieve screen (Vansil W-10).

b. Medium grade-particle size which shows a retention of 2% on 325 mesh standard sieve screen (Vansil W-20).

c. Fine grade-particle size which shows a retention of 2% on a 400 mesh standard sieve screen (Vansil W-30).

Using the boric acid-mannitol complex as an acid gave the following percent suppression of formaldehyde 13 days after the particle board was made using the three grades of calcium metasilicate: a. (Vansil W-10) 18%; (Vansil W-20) 29%; c. (Vansil W-30) 20% in amounts of 58 g per gallon of adhesive. Increasing the calcium metasilicate (Vansil W-10) to twice this amount seemed to be detrimental with the boric acid-mannitol system but not with boric acid alone (26%). The calcium metasilicate described can be obtained from R. J. Vanderbilt Company, Inc. and is sold under the mark Vansil W-30, -W-20 and -W-10 and is preferred. Other commercial products such as NYAD, Wollastonite 325, 400 and G from Interspace Corporation may also be employed.

It is, of course, not critical to the invention how the urea formaldehyde adhesive is used. Applications to the preparation of particle boards, laminates, plywood, fiber boards and wood moldings can be made and result in a reduction of the outgassing of formaldehyde.

Modified urea-formaldehyde adhesives may also be successfully employed and the out-gassing of formaldehyde is still reduced.

It is common to modify urea-formaldehyde adhesives with numerous modifying agents such as resorcinol, melamine, lignin products and tannins or to replace the urea with phenol. Such modifiers again are well-known and are disclosed in the Beat Mayer text on Urea-Formaldehyde Resins.

The following examples are offered to further illustrate, but not limit, the process and product of this invention.

EXAMPLES

In the examples which are hereinafter presented, a standard urea-formaldehyde adhesive furnished by Tailored Chemical Products, Inc., 1144 Second Avenue N. W. Hickory, N. C. 28603 was used.

The wood chips employed were also furnished by Tailored Chemical Products, Inc. and had a moisture content of 4%. Wood chips with a zero percentage of moisture were prepared by drying at 101° C. to constant weight.

The particle boards were prepared in a thickness of ⅜ inches by treating wood chips pretreated with boric acid or a boric acid-mannitol complex with 10% by weight of urea-formaldehyde adhesive with a suspension of calcium metasilicate (Wollastonite) at pressures of 172-200 psi at 350° C. with a five minute curing time.

The formulations and conditions employed are listed below:

SAMPLE 1: A sample of wood chips (zero moisture content) weighing 747 g was sprayed in a rotating drum first with a solution of boric acid (3.28 g) in 80 ml of water and then with 100 ml of UF adhesives containing 3.06 g of calcium metasilicate (Vansil W-10). The dispersion of the solid additive in the adhesive was aided by making initially a suspension of the additive in 5 ml of water and adding it to the adhesive with vigorous stirring.

SAMPLE 2 (Control): A sample of wood chips (4% moisture content) weighing 777 g was sprayed in a rotating drum first with 50 ml of water and then with 100 ml of UF adhesive.

SAMPLE 3: A sample of wood chips (4% moisture content) weighing 777 g was sprayed in a rotating drum first with a solution containing 1.64 g of boric acid and 2.36 g of mannitol in 50 ml of water and then with 100 ml of UF adhesive containing 1.53 g of calcium metasilicate (Vansil W-10). The dispersion of the solid additive in the adhesive was aided by making initially a suspension of the additive in 3 ml of water and adding it to the adhesive with vigorous shaking or stirring.

SAMPLE 4: The composition and preparation was similar to sample 3 except for the additive; Vansil W-20 was used in place of the Vansil W-10.

SAMPLE 5: The composition and preparation was similar to sample 3 except for the additive; Vansil W-30 was used in place of the Vansil W-10.

SAMPLE 6: A sample of wood chips (4% moisture content) weighing 777 g was sprayed in a rotating drum first with a solution containing 3.28 g of boric acid and 4.72 g of mannitol in 48 ml of water and then with 100 ml of UF adhesive containing 3.06 g of calcium metasilicate (Vansil W-10). The dispersion of the solid additive in the adhesive was aided by making initially a suspension of the additive in 5 ml of water and adding it to the adhesive with vigorous shaking or stirring.

SAMPLE 7: A sample of calcium metasilicate (Vansil W-10) was converted to silicic acid by neutralization with phosphoric acid. The produce was filtered, dried at 100° C. and passed through a 100 mesh standard sieve screen. A sample of wood chips (10% moisture content) weighing 830 g was sprayed in a rotating drum with 100 ml of UF adhesive containing 4.84 g of the above silicic acid. The dispersion of the solid in the adhesive was aided by making initially a suspension of 5 ml of water and adding it to the adhesive with vigorous shaking or stirring.

The amount of formaldehyde released from the particle board was determined using the Fahrni method as modified by K. Brunner (Holz-Zentralblatt, 111, 16610 (1978)). The method consists of placing a 10 ml beaker with 3 ml of water on the surface of the particle board and enclosing it with a circular crystallizing dish 100 mm in diameter and 50 mm high. The dish was weighed down with a weight approximately 780–800 g. The sample was exposed to the solution for one to two hours and the resulting solution was analyzed for formaldehyde using the acetylacetone method (Hantzsch Reaction). Three milliliters of the test solution are treated with three milliliters of reagent (150 g ammonium acetate, 3 ml glacial acetic acid and 2 ml of 2,4-pentanedione(acetyl-acetone) diluted to one liter) and the resulting solution is kept at 28° C. for 1.5 to 2 hours. Analysis for formaldehyde was carried out using a Bausch and Lomb Spectronic 20 set at a wave length of 412nm.

The results for the various samples mentioned earlier and expressed in terms of percent formaldehyde suppression are listed in Table I. The exposure time for the samples was one hour, except for the last two values for eleven and thirteen day studies; these were exposed for two hours. The temperature was not controlled and is listed for each run. The day notation is the age of the particle board.

TABLE I

| | Percent Supression of Formaldehyde Emission | | | | | | | |
|---|---|---|---|---|---|---|---|---|
| Temp | 31° | 28° | 26° | 25° | 27° | 26.5° | 28° | 28.5° |
| Age (days) | 1 | 4 | 5 | 6 | 7 | 8 | 11 | 13 |
| Sample | | | | | | | | |
| 1 | 11 | 32 | 10 | 41 | 35 | 31 | 15 | 26 |
| 3 | 2 | 5 | 11 | 16 | 3 | 17 | 14 | 18 |
| 4 | 13 | 5.0 | 25 | 20 | 25 | 34 | 28 | 29 |
| 5 | 5 | 7 | 1 | 15 | 6 | 23 | 19 | 20 |
| 6 | 0 | 2.5 | 11 | 13 | 0 | 0 | 0 | 10 |
| 7 | 5 | | | 8 | | 13 | | 20 |

Variations in these percentages may be caused by the variation in temperatures and humidity.

The percent suppression values were calculated from a comparison of the absorbance values of the standard or control Sample 2 with that of the samples containing the additives as determined by the Spectronic 20. The absorbance values are proportional to the concentration of the formaldehyde. For example, on the eighth day, the absorbance for Sample 2 was 0.286 and that for Sample 1 was 0.198. The difference of 0.088 represents a 31 percent (0.088/0.286) suppression in formaldehyde emission.

The percent suppression of formaldehyde emission obtained in this manner is in agreement relatively with the percent suppression obtained using the dessicator test. This test, which is described in Beat Meyer's text, p. 150, which is incorporated herein by reference, was carried out for two hours with 24 day old samples that had been stored for 24 hours at 50% humidity.

TABLE II

| Percent Suppression of Formaldehyde Emission Using The Dessicator Test | | |
|---|---|---|
| Board # | μgHCHO/ml | % Suppression |
| 1 | 20 | 33 |
| 2 | 30 | — |
| 3 | 15 | 50 |
| 4 | 12 | 60 |
| 5 | 19 | 37 |

TABLE II-continued

| Percent Suppression of Formaldehyde Emission Using The Dessicator Test | | |
|---|---|---|
| Board # | μgHCHO/ml | % Suppression |
| 6 | 28 | 7 |

The percent suppression is calculated by taking the differences in concentration of formaldehyde collected for the control and other samples and dividing by the control sample. For example, the difference between board 4 and the control is 18 μgHCHO/ml or a 60 percent suppression (18/30).

The larger suppression observed in this test indicates that humidification increases the release of formaldehyde from the control sample more than from the samples with the additives. This behavior was also found with UF foam insulation (see my prior issued patent, U.S. Pat. No. 4,366,264, issued Dec. 28, 1982).

What is claimed is:

1. A method of preparing formaldehyde suppressed particle board which employs a formaldehyde resin adhesive for bonding the particles of said board, comprising:
   uniformly coating particles used in making said board with a adhesive mixture which is a formaldehyde resin containing a small but formaldehyde suppressing effective amount of a weak acid which is substantially inert to formaldehyde resins, and calcium metasilicate, and pressing the coated particles into a particle board.

2. The method of claim 1 wherein the formaldehyde resin adhesive is a urea formaldehyde resin.

3. The method of claim 1 wherein the formaldehyde resin is a phenol formaldehyde resin.

4. The method of claim 2 wherein the weak acid is boric acid.

5. The method of claim 1 wherein the adhesive mixture also contains a small amount of an organic hydroxyl compound containing more than one hydroxyl group per molecule.

6. The method of claim 5 wherein the organic hydroxyl group containing compound is selected from the group consisting of mannitol, invert sugar, dextrose and glycerol.

7. The method of claim 6 wherein the organic hydroxyl group containing compound is mannitol.

8. The method of claim 7 wherein the ratio of boric acid to mannitol is about 2:1.

9. The method of claim 8 wherein the amount of calcium metasilicate is from about 15 grams per gallon of resin to about 125 grams per gallon of resin.

10. The method of claim 9 wherein the amount of calcium metasilicate is from about 30 grams per gallon of resin to about 120 grams per gallon of resin.

11. The method of claim 10 wherein the amount of calcium metasilicate is from about 60 grams per gallon of resin to about 120 grams per gallon of resin.

12. The method of claim 11 wherein the particle size of said calcium metasilicate is about 2% retained in a 200 mesh standard sieve screen to 400 mesh standard sieve screen.

13. The method of claim 1 wherein the amount of adhesive mix employed is from about 6% to about 10% by weight of said particles.

14. The method of claim 13 wherein the amount of said adhesive adhesive mix is about 10% by weight of said particles.

15. A method of preparing formaldehyde suppressed particle board which employs urea formaldehyde resin for bonding the particles of said board, comprising:
uniformly coating particles used in making said board with a small but effective amount of an aqueous solution of boric acid;
mixing urea formaldehyde resin with a small but suppression effective amount of a calcium metasilicate;
uniformly coating said mixed resin on said particles; and
pressing said coated particles into a particle board form.

16. The method of claim 15 wherein said aqueous solution of boric acid contains mannitol, the ratio of boric acid to mannitol being about 2:1.

17. A urea formaldehyde resin containing particle board of substantially reduced formaldehyde outgassing properties, said board comprising:
about 90% of wood chips;
about 10% of a urea formaldehyde resin mix;
said mixing containing a small but suppression effective amount of calcium metasilicate and a weak acid which is substantially inert to urea formaldehyde resin.

18. The particle board of claim 17 wherein the acid is boric acid.

19. The particle board of claim 17 wherein said mix also contains a small amount of mannitol.

* * * * *